(12) United States Patent
Dom et al.

(10) Patent No.: US 7,885,859 B2
(45) Date of Patent: Feb. 8, 2011

(54) ASSIGNING INTO ONE SET OF CATEGORIES INFORMATION THAT HAS BEEN ASSIGNED TO OTHER SETS OF CATEGORIES

(75) Inventors: Byron Edward Dom, Los Gatos, CA (US); Hui Han, San Jose, CA (US); Ramnath Balasubramanyan, Mountain View, CA (US); Dmitry Yurievich Pavlov, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1300 days.

(21) Appl. No.: 11/373,726

(22) Filed: Mar. 10, 2006

(65) Prior Publication Data

US 2007/0214140 A1    Sep. 13, 2007

(51) Int. Cl.
*G06Q 30/00* (2006.01)
(52) U.S. Cl. .................... 705/26; 706/25; 707/740
(58) Field of Classification Search ............ 705/26; 706/25; 707/740
See application file for complete search history.

(56) References Cited

U.S. PATENT DOCUMENTS

| | | | |
|---|---|---|---|
| 5,815,689 A | 9/1998 | Shaw et al. | |
| 6,055,515 A | 4/2000 | Consentino et al. | |
| 6,412,012 B1 | 6/2002 | Bieganski et al. | |
| 6,438,543 B1 | 8/2002 | Kazi et al. | |
| 6,578,030 B1 | 6/2003 | Wilmsen et al. | |
| 6,633,852 B1 | 10/2003 | Heckerman et al. | |
| 6,697,799 B1 | 2/2004 | Neal et al. | |
| 6,728,752 B1 | 4/2004 | Chen et al. | |
| 6,751,600 B1 | 6/2004 | Wolin | |
| 6,785,671 B1 | 8/2004 | Bailey et al. | |
| 6,910,044 B2 | 6/2005 | Weinberg et al. | |
| 6,947,936 B1 | 9/2005 | Suermondt et al. | |
| 7,082,426 B2 | 7/2006 | Musgrove et al. | |
| 7,086,002 B2 | 8/2006 | Elo et al. | |
| 7,117,207 B1 | 10/2006 | Kerschberg et al. | |
| 7,225,146 B2 | 5/2007 | Tenorio | |
| 7,319,971 B2 | 1/2008 | Abrahams et al. | |

(Continued)

OTHER PUBLICATIONS

U.S. Appl. No. 10/788,537, filed Feb. 26, 2004, Office Action Mailing Date Sep. 11, 2006.

(Continued)

*Primary Examiner*—Yogesh C Garg
(74) *Attorney, Agent, or Firm*—Hickman Palermo Truong & Becker LLP; Brian D. Hickman

(57) ABSTRACT

Techniques are described for assigning, to target categories of a target scheme, items that have been obtained from a plurality of sources. In situations in which one or more of the sources has organized its information according to a source scheme that differs from the target scheme, the assignment may be based, in part, on an estimate of the probability that items from a particular source category should be assigned to a particular target category. Such probability estimates may be based on how many training set items associated with the particular source category have been assigned to the particular target category. Source categories may be grouped into clusters. The probability estimates may also be based on how many training set items within the cluster to which the particular source category has been mapped, have been assigned the particular target category.

22 Claims, 5 Drawing Sheets

U.S. PATENT DOCUMENTS

| | | |
|---|---|---|
| 2001/0044758 A1 | 11/2001 | Talib et al. |
| 2002/0055903 A1 | 5/2002 | Solomon |
| 2002/0062258 A1 | 5/2002 | Bailey et al. |
| 2002/0077930 A1 | 6/2002 | Trubey et al. |
| 2002/0184116 A1 | 12/2002 | Tam et al. |
| 2003/0101104 A1 | 5/2003 | Dimitrova et al. |
| 2003/0120662 A1 | 6/2003 | Vishik |
| 2003/0149675 A1* | 8/2003 | Ansari et al. .................. 706/2 |
| 2003/0204447 A1 | 10/2003 | Dalzell et al. |
| 2004/0015408 A1 | 1/2004 | Rauen et al. |
| 2004/0093331 A1 | 5/2004 | Garner et al. |
| 2004/0193591 A1 | 9/2004 | Winter |
| 2004/0249831 A1 | 12/2004 | Fagin et al. |
| 2005/0149390 A1 | 7/2005 | Scholl et al. |
| 2006/0064411 A1 | 3/2006 | Gross et al. |
| 2006/0095270 A1 | 5/2006 | Somerville |
| 2006/0095370 A1 | 5/2006 | Seth et al. |
| 2006/0184430 A1* | 8/2006 | Gavarini .................... 705/26 |
| 2006/0282339 A1 | 12/2006 | Musgrove et al. |
| 2007/0022021 A1 | 1/2007 | Walker et al. |
| 2010/0057806 A1* | 3/2010 | Neal et al. ................. 707/740 |

OTHER PUBLICATIONS

U.S. Appl. No. 10/789,837, filed Feb. 26, 2004, Office Action Mailing Date Sep. 13, 2006.

U.S. Appl. No. 10/788,537, filed Feb. 26, 2004, Office Action Mailing Date Feb. 15, 2007.

U.S. Appl. No. 10/789,837, Final Office Action, mailed Apr. 15, 2008, 18 pages.

Softface: Softface to create structured catalog content for leading school supplier. M2 Presswire. Coventry. May 24, 2001, pp. 1-1.

* cited by examiner $$\arg\max_i P(C_i | X_0, <MC, MID>_j), i \in [1..|C|], j \in [1..|M|], \} 200$$

, where $|M|$ is the number of $<MC, MID>_j$ pairs.

$$= argmax_i \frac{P(X_0, <MC, MID>_j | C_i) * P(C_i)}{P(X_0, <MC, MID>_j)}$$

$$= argmax_i P(X_0 | <MC, MID>_j, C_i) * P(<MC, MID>_j | C_i) * P(C_i)$$
$$= argmax_i P(X_0 | <MC, MID>_j, C_i) * P(C_i | <MC, MID>_j) * P(<MC, MID>_j)$$
$$= argmax_i P(X_0 | <MC, MID>_j, C_i) * P(C_i | <MC, MID>_j)$$
$$= argmax_i P(X_0 | C_i) * P(C_i | <MC, MID>_j) \} 210$$

FIGURE 2

$$P(C_i| <MC, MID>_j) = \frac{n_{j,i} + \delta}{|n_j| + |C| * \delta}, i \in [1..|C|], \} \ 300$$

where $n_{j,i}$ refers to the number of category-$i$ products that the $j_{th}$ <MC, MID> has; $n_j$ refers to the total number of products that the $j_{th}$ <MC, MID> has.

FIGURE 3

Figure 4: Accumulated categorization accuracy with respect to $Y$.

ASSIGNING INTO ONE SET OF CATEGORIES INFORMATION THAT HAS BEEN ASSIGNED TO OTHER SETS OF CATEGORIES

RELATED APPLICATIONS

This application is related to U.S. Provisional Application Ser. No. 60/548,346 entitled "AUTOMATIC PRODUCT CATEGORIZER", filed Feb. 27, 2004 by Byron Edward Dom et al. which is incorporated by reference in its entirety for all purposes as if fully set forth herein.

This application is related to U.S. patent application Ser. No. 10/789,839 filed Feb. 26, 2004 entitled "SCORING MECHANISM SELECTION ALONG MULTIPLE DIMENSIONS" naming Acton et al. as inventors, which is incorporated by reference in its entirety for all purposes as if fully set forth herein. Herein referred to as '839.

This application is related to U.S. patent application Ser. No. 10/789,837 filed Feb. 26, 2004 entitled "PRODUCT DATA CLASSIFICATION" naming Acton et al. as inventors, which is incorporated by reference in its entirety for all purposes as if fully set forth herein. Herein referred to as '837.

This application is related to U.S. patent application Ser. No. 10/788,537 filed Feb. 26, 2004 entitled "ASSOCIATING PRODUCT OFFERINGS WITH PRODUCT ABSTRACTIONS" naming Acton et al. as inventors, which is incorporated by reference in its entirety for all purposes as if fully set forth herein. Herein referred to as '537.

This application is related to U.S. patent application Ser. No. 10/920,588 filed Aug. 17, 2004 entitled "AUTOMATIC PRODUCT CATEGORIZATION" naming Dom et al. as inventors, which is incorporated by reference in its entirety for all purposes as if fully set forth herein. Herein referred to as '588.

FIELD OF THE INVENTION

The present invention relates to automated categorization and, more specifically, to automated categorization into one categorization scheme of items that have already been categorized in other categorization schemes.

BACKGROUND

To make sense of information, humans tend to organize the information that they manage into categories. Once organized into categories, humans can locate specific pieces of information more quickly by first identifying the category to which the information belongs, and then searching through the information that has been assigned to that category.

The categorization schemes that people use to organize their information may vary significantly from person to person. For example, some people may use a single-tier categorization scheme. Other people may use a more complex, hierarchical categorization scheme in which "parent" categories may have one or more "child" categories. Likewise, some categorization schemes may be coarse-grained (resulting in relatively few categories with relatively many members) or fine-grained (resulting in relatively more categories with relatively fewer members).

In a variety of contexts, it is useful to organize into a single unified categorization scheme (the "target" scheme) information that comes from many sources. For example, it is becoming increasingly common for shoppers to search for the particular product in which they are interested using electronic search mechanisms, such as Internet-based search engines. As used herein, the term "product" refers to any form of sellable unit, including services, intangibles, and physical and software products. The complex systems used by such electronic search mechanisms to process incoming product data from multiple merchants, and deliver that product data in the form of search results to millions of customers, must ensure that customers receive the best information available.

In order to do this, data that represents an offer to sell a particular product by a particular party, referred to herein as "product offering information", must be obtained for multiple product offerings. Once obtained, the product offering information is categorized. In this example, the categorization scheme used by the search engine is the "target scheme".

There may be a variety of reasons to organize into a single target scheme information obtained from multiple sources. For example, in the context of a search engine, the product information may be categorized in order to, among other things, determine how much merchants associated with the product offerings are charged for inclusion of the product offerings in the corresponding search mechanism. Merchants are often charged a certain amount of money by the search engine owner every time a product of the merchant is selected by a user of the search mechanism—a cost-per-click (CPC) charge.

In many contexts, the sources from which information is obtained may have their own categorization schemes ("source schemes"). For example, some or all of the merchants from whom a search engine obtains product offering information may their own scheme for categorizing their products.

When a target scheme is used to organize information from many sources, the fact that some or all of information has already been categorized in a source scheme has not been particularly helpful to the party responsible for organizing the information into the target scheme. The usefulness of the source scheme information is diminished due to the differences between the source scheme and the target scheme, and between the source scheme and the other source schemes that are feeding into the same target scheme. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which:

FIG. 2 illustrates a formula for use in classifying a product, according to an embodiment of the invention;

FIG. 3 illustrates a formula for estimating P(Ci|<MC, MID >j) using Laplacine's succession rule, which may be used in an embodiment of the invention;

DETAILED DESCRIPTION

Figure 1:
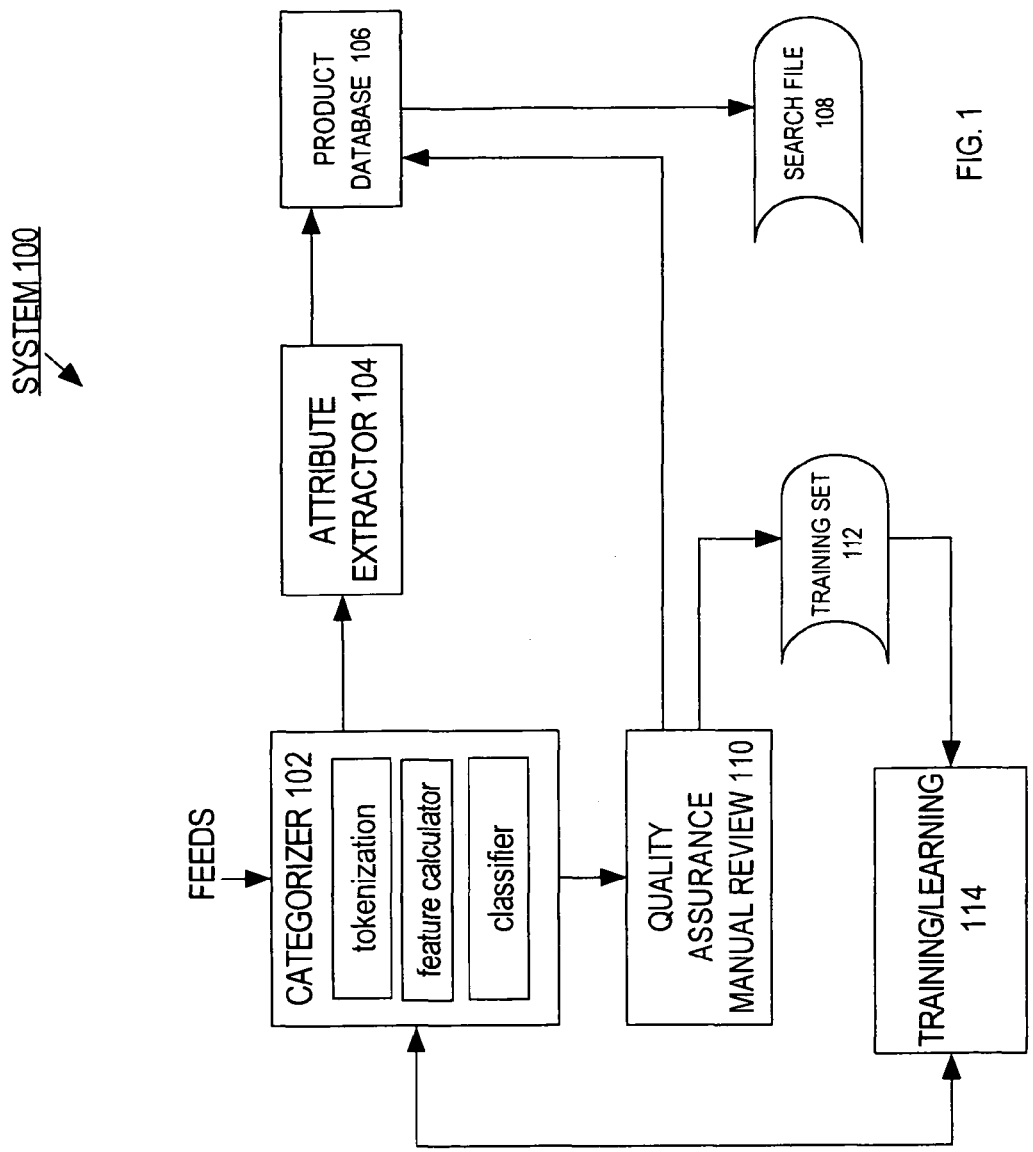
FIG. 1 is a block diagram of an automated categorization system, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for assigning, to target categories of a target scheme, items that have been obtained from a plurality of sources. In situations in which one or more of the sources has organized its information according to a source scheme that differs from the target scheme, the assignment may be based, in part, on "category-to-category probabilities".

A category-to-category probability is an estimate of the probability that items from a particular source category should be assigned to a particular target category. This probability may be based, at least in part, on what percentage of items in a training set, which belong to the particular source category, have been assigned to the particular target category. Thus, if no training set items from source category X have ever been assigned to a target category Y, then the category-to-category probability of category X relative to Y is low. Conversely, if all training set items from source category X have been assigned to target category Y, then the category-to-category probability of category X relative to Y is high.

According to one embodiment, category-to-category probabilities are used as one of the factors to determine the target category to which a new item is assigned. For example, an item from source category X may be assigned to target category Y if 90% of all previous items from source category X have been assigned to target category Y. On the other hand, the same item may be assigned to a different target category (e.g. target category Z) if only 10% of all previous items from source category X have been assigned to target category Y.

In some situations, different sources apply different meanings to the same category name. For example, an "ornament" from a car dealership may be very different from an "ornament" from a Christmas store. Accordingly, in one embodiment, the source of an item is treated as a component of the source category. Thus, "category X from source A" is treated as one category, and "category X from source Y" is treated as another category. In such an embodiment, the category-to-category probability that an "ornament" item from a car dealership should be assigned to a particular target category is not affected by how many "ornaments" from the Christmas store have been assigned to that particular target category.

According to one embodiment, a threshold test is performed to determine whether category-to-category probabilities will be used to categorize a new item. For example, category-to-category probabilities may only be used to determine the target category for a new item from source category X when more than a predetermined number of items from source category X have already been categorized in the target scheme.

In one embodiment, source categories are mapped to source category clusters and the cluster-to-category probabilities are used to assign items to target categories. A cluster-to-category probability generally represents the likelihood that an item that maps to a particular source category cluster should be assigned to a particular target category. For example, assume that source categories X, Y and Z all map to source category cluster C. In this example, the cluster-to-category probability that an item from any of source categories X, Y and Z should be assigned to a particular target category B may be based on how many previously assigned items from source categories X, Y and Z were assigned to target category B. If many items from categories Y and Z were assigned to category B, then the cluster-to-category probability that an item form source category X should be assigned to category B may be high, even if few or no items form category X have been assigned to category B.

Product Categorization

For the purpose of explanation, examples shall be given of how the categorization techniques described herein may be applied in the context of a product categorization system. While examples shall be given in the context of product categorization, product categorization is merely one example of a context in which the categorization techniques described herein may be applied.

Product categorization is an important business application of text categorization. The '588 Application, referred to above, describes a product categorization environment in great detail. In a typical product categorization system, paying merchants supply product offer feeds, in which each product offer is a separate record. An example of one such record is:

<title:Stacky Wrappy><model:><partnum:><brand:><isDblChecked:><price:13><merchantCategory:Baby and toddler nursery Nursery Themes><ppath: 96605758><manufacturer:><mid: mid=1012440><oldBccat:96365799><upc:><description:Ring around the stroller! Its an entertaining travel toy . . . its a coordination-building stacking ring. Twist this flexible friend around a stroller or car seat bar and baby will eagerly explore its rattles ribbons and crinkly sounds. Then take it off the stroller bar and use it as a stacking ring that challenges babys fine motor skills. For ages 6 months and up. Imported.><lastUpdatedOn:25-AUG-04><mid_pid: 1012440^10413><createdOn:03-MAR-04><merchantStatus:1>

Depending on the product categorization system, some fields in the product offer records may be considered "required", while others are "optional". For example, a product categorization system may be designed such that every offer must have values for: title, merchant id (mid), sku and price. The other optional fields may include, for example, description and merchant category (mc).

Within a product offer record, a merchant category field stores a value that indicates how the merchant supplying the product offer record has categorized the product represented in the product offer record. However, the category indicated in the merchant category field is a category from the merchant's categorization scheme, not the categorization scheme used by the categorization system that receives the product offer record. Thus, in the context of product categorization system, the "source scheme" is the categorization scheme used by a merchant that is submitting a product offer record, and the merchant category field of the product offer record indicates the "source category" of the product. Conversely, the categorization scheme used by the product categorization system is the "target scheme". The goal of the product categorization system is to assign to the product represented by the product offer record to the category within the target scheme that most accurately applies to the product.

In embodiments described hereafter, merchant categories and merchant identifiers are used to improve categorization accuracy within a product categorization system. Because products of most merchants are distributed in a limited number of target categories, the product-category distribution of a merchant may be used to model the prior category probability in the Naive Bayes model. This special modeling of prior category probability may result in a significant improvement in categorization accuracy.

Product Categorization System

FIG. 1 is a block diagram of a product categorization system 100 in which the categorization techniques described herein may be used. System 100 includes a categorizer 102, an attribute extractor 104 and a product database 106.

Categorizer 102 receives product offer feeds from a plurality of sources. The sources may include participating merchants, and "crawled merchants". Participating merchants are merchants that prepare and provide feeds of product offer records to the product categorization system 100. Crawled merchants, on the other hand, are merchants whose product offering information is obtained by using a web crawler to crawl the site of the merchant, extract information therefrom, and build a feed similar to that provided by the participating merchants.

Categorizer 102 determines, for each product offer record received, which category in the target scheme is most appropriate for the product represented by the product offer record. In one embodiment, categorizer 102 determines both a target category, and a confidence value. The confidence value estimates the likelihood that the selected target category is the most appropriate category, in the target scheme, for the product associated with the product offer record. The confidence value may take into account a variety of factors, such as the estimated cost of erroneously categorizing a particular product.

When the confidence value for a particular product-to-category assignment is low (or the cost of miscategorization is high), the product offer record may be sent to quality asurance 110 for manual review. At quality assurance, a relatively more expansive analysis is performed on the product offer record to determine the appropriate target category for the product represented by the record. The analysis may be a more rigorous automated algorithm, or may actually involve human analysis.

Once a product offer record has been assigned a target category in quality assurance 110, the product-to-category assignment is added to the training set 112, which is used in the training/learning 114 of the categorizer 102 to improve the accuracy of future automated assignments made by the categorizer 102.

Once assigned to a target category, attribute extractor 104 determines attributes of the product based on information in the product offer record, and stores information about the product and its attributes in a product database 106. A search file 108 may be generated from the product database 106. The search file 108, in turn, may be used by a search engine to answer search queries submitted by users searching for products. Search file 106 may also be used by a search engine to provide appropriate advertisements to include in web pages that are to be provided to users that are not necessarily searching for products.

In the illustrated embodiment, categorizer 102 includes a tokenization unit, a feature calculator, and a classifier. The tokenization unit breaks the raw product offer record into tokens. The tokens may, for example, correspond to fields within the record. Feature calculator counts the number of instances of each type of token. The classifier determines the target category for the product represented by the record, and the confidence value associated with the target category determination.

The classifier may use, for example, the Naïve Bayes model to determine the target category for a product offer record. The classifier may provide, as input to the Naïve Bayes model, a "text" parameter and "special" parameters. The text parameter may include, for example, text from various text fields within the product offer record. Those text fields may include a title field, a description field, and a merchant category field. The special parameters may include values from fields such as merchant ID, price, and brand.

Using Merchant Categories in Product Categorization

Techniques shall be described hereafter utilizing merchant id (mid) and merchant category (mc) in product categorization. Various techniques shall be described of how the <mid, mc> combination of values associated with a product offer record may be used by a categorizer to determine the appropriate target category for the product represented by the product offer record.

For the purpose of explanation, consider the following scenario (scenario 1): Eight products from merchant X associated with merchant category Y are in the training set 112 of product categorization system 100. Quality assurance 110 has assigned six of those products to a target category A, and two of those products to target category B. No products from merchant X associated with merchant category Y have been assigned to category C.

In a simple embodiment, newly received product offerings that have a given <mc, mid> combination are forced into the subset of categories in which there are training examples with that same <mc, mid> combination. Under the circumstances presented in scenario 1, categorizer 102 would only consider target categories A and B when assigning a target category to new products from merchant X when those new products are associated with merchant category Y.

In the simple embodiment describe above, the <mc, mid> combination associated with a new product determines the target categories that are considered by categorizer 102 (the "qualifying categories"). Instead of or in addition to determining a set of qualifying target categories, the <mc, mid> combination may be used to select the best target category for a product offering. For example, according to a more sophisticated embodiment, a <mc, mid>-specific category-to-category probability $p(c|<mc, mid>)$ is determined for each target category, and is one of the factors used by the categorizer 102 to determine which target category to assign to a new product offering.

In the context of product categorization, the category-to-category probability represents a merchant-category-specific a priori category probability. Specifically, $p(c|<mc, mid>)$ represents the a priori probability that a product offering associated with a particular <mc, mid> combination should be assigned to a particular target category c.

Given the facts presented in scenario 1, the probability that a product offering associated with <X, Y> should be mapped to category A is 75%. Thus, $p(A|<X, Y>)=75\%$. On the other hand, the probability that a product offering associated with <X, Y> should be mapped to category B is 25%. Thus, $p(B|<X, Y>)=25\%$. The probability that a product offering associated with <X, Y> should be mapped to category C is 0%. Thus, $p(C|<X, Y>)=0\%$.

The fact that no product offering associated with <X, Y> has been mapped to category C does not necessarily mean that the probability that a new offering associated with <X, Y> should be mapped to category C is actually zero. After all, the <X, Y> products in the training set 112 are only a sampling of all possible <X, Y> products. Therefore, according to one embodiment, the probability values used by the categorizer 102 are smoothed. The probability values may be smoothed, for example, by computing probability estimates using Laplace's rule of succession. However, Laplace smoothing is merely one example of how probability estimates may be smoothed. The techniques described herein are not limited to any particular smoothing mechanism.

In an embodiment that uses smoothing, even though no <X, Y> products in the training set have been mapped to category C, the probability that a new offering associated with <X, Y> should be mapped to category C may actually be some value greater than zero. Similarly, even though exactly 75% of the <X, Y> products in the training set have been assigned to category A, the probability that a new offering associated with <X, Y> should be mapped to category A may actually be some value less than 75%.

Assigning a Product Category Based on Merchant Category

As mentioned above, how a merchant has categorized a product (the source category) may be used as a factor in determining how to categorize the product in a target scheme. However, in various embodiments, the merchant category is not the only factor. For example, the product offer record that represents a product may include numerous other pieces of information that are factored into the categorization determination. Those factors may include, for example, the words contained in the textual description of the product, the title of the product, the price of the product, etc.

According to one embodiment, the target categorization is chosen based on the formula: $\hat{c}$=argmax p(x|c)p(c|<mc, mid>), where $\hat{c}$ is the target category that is selected for the product, x is the feature vector produced based on the product offer record, p(x|c) is the global (independent of <mc, mid>) probability that the feature vector x should be assigned to category c, <mc, mid> is the merchant category, merchant identifier combination associated with the product offer record, and p(c|<mc, mid>) is the a priori (independent of the feature vector x) probability that the <mc, mid> associated with the product offer record should be mapped to the category c.

Note that in this example, the source category is actually the combination of two pieces of information: the merchant identifier and the merchant category. Treating the merchant identifier as a component of the source category helps avoid inaccuracies that may result from two different merchants using the same category labels to mean very different things. However, in environments where disparate use of the same labels is less likely, using the merchant category by itself may be sufficient.

According to another embodiment, when sufficient data exists for all source categories, a category-conditional feature vector x probability p(x|<mc, mid>) can be computed from only those training documents in <mc, mid> whose manual category is c. This would amount to having a separate classifier for each particular <mc, mid>. Thus, the target categorization would chosen based on the formula: $\hat{c}$=argmax p(x|c, <mc, mid >) p(c|<mc, mid>).

These are merely two examples of how source categories may be used as a factor in determining the appropriate target category for items obtained from sources that have already assigned the items to categories within their own categorization schemes. The techniques are not limited to any particular manner of factoring the source categorization information into the target categorization determination.

Threshold Test

In scenario 1 described above, the training set had only eight products associated with the source category <X, Y>. The smaller the number of <X, Y> products in the training set, the greater the chances that the training set does not accurately reflect the entire population of <X, Y> products. Similarly, the greater the number of target categories to which <X, Y> products have been assigned, the less useful the <X, Y> source category designation is in predicting the appropriate target category to assign to a product associated with the <X, Y> source category.

Therefore, in one embodiment, the category-to-category probability is not used as a factor in determining the target categories of products associated with all <mc, mid> pairs. Specifically, if a product is associated with an <mc, mid> combination that either (1) has too few products in the training set, or (2) spans too many categories, then category-to-category probability is not used to determine the appropriate target category for the product.

A source category that has too few products in the training set is referred to herein as an "insufficiently sampled source category". A source category whose items in the training set have been assigned to too many target categories is referred to herein as a "non-determinative source category".

According to one embodiment, when the source category associated with a new offer record is either an insufficiently sampled source category or a non-determative source category, rather than determine the target category according to the formula $\hat{c}$=argmax p(x|c)p(c|<mc, mid>)

the target category may be chosen according to the formula:

$\hat{c}$=argmax p(x|c)p(c) or with a so-called "discriminative" classifier of which a common form is $\hat{c}$=argmax p(c|x).

In this example, the global a priori probability p(c) that any product should be assigned to a particular category is used instead of the probability that a product with a particular source category should be assigned to the particular category p(c|<mc, mid>). In other words, how popular a target category is across all products in the training set affects how a new product is categorized, not how popular the target category is for only those products in the training set that are associated with the same source category as the new product.

Non-Determinative Source Categories

The threshold used to determine whether a source category is non-determinative source category may vary from implementation to implementation. For example, if the target scheme includes a million categories, then it may still be useful to take into account a source category even though products from that source category have been assigned to a thousand different categories. However, if the target scheme only includes two thousand categories, it may not be useful to take into account a source category whose products have been assigned to a thousand different categories.

Insufficiently Samples Source Categories

The threshold used to determine whether a source category is an insufficiently samples source category may also vary from implementation to implementation. For example, in one environment the source categories may be very specifically defined. Consequently, there may be little variation in the types of things that are associated with any given source category. For example, it is not likely that there will be much variation between items that belong to an "electric toothbrush" source category.

On the other hand, another environment may have vary coarse and loosely defined source categories, resulting in significant variation among the things that are associated with any given source category. For example, a source category "household goods" can include anything from a sponge to a bed.

In an environment that has finely defined source categories, it may be useful to consider the source category in the target category selection process even though the training set has few products in the source category. For example, assume that the training set has only a few products that are associated with an "electric toothbrush" source category. If it is known that there is little variation among the products from that source category, then the fact that all products in the training set, that are associated with that particular source category, have been assigned to the same target category may be useful.

On the other hand, if there is significant variation between products associated with a source category (e.g. household goods), then the fact that all products in the training set that are associated with that particular source category have been assigned to the same target category may not be particularly useful. Taking the source category into account under such circumstances may result in over-fitting, producing less accurate results.

Handling Items that do not Specify a Source Category

In categorization systems where "merchant category" is an optional field for product offer records, some merchants may provide product offer records that do not contain merchant category information. According to one embodiment, for merchants that do not supply a merchant category (mc), their merchant identifiers (mids) are treated in exactly the same manner as a <mc, mid> pair. In other words, such products are considered to be associated with the category <mc, null>.

Source Category Clusters

To reduce the number of insufficiently sampled source categories and to benefit from the statistical-sampling-related benefit of having more samples from which to estimate probability parameters, source categories may be grouped into source category clusters. When determining the category-to-category probabilities for an item, all training set items that belong to the same source category cluster are considered.

For example, assume that source categories A, B and C have been grouped into the same source category cluster X. Assume that the training set includes five items associated with source category A, ten items from source category B, and three items from source category C. Thus, the total number of items in the training set from the source categories that belong to source category cluster X is 18.

Assume that the threshold for determining whether a source category is an insufficiently sampled source category is 10. Under these circumstances, each of source categories A, B and C, when considered individually, are insufficiently sampled source categories. However, when considered collectively, source categories A, B, C, have 18 items in the training set, and therefore do not qualify as insufficiently sampled source categories.

According to one embodiment, source category clusters are used to determine the probability that the source category of the item should be mapped to target categories. For example, assume that nine of the eighteen training set items of source category cluster X have been assigned to target category Z. Under these circumstances, the classifier may estimate a probability of 50% that a new item from source category A should be assigned to target category Z.

This estimate is based on all training set items that belong to categories that belong to source category cluster X. Thus, the probability estimate may be 50% even though no training set items from category A were assigned to target category Z.

Since the probability estimate is determined based on all training set items that belong to a source category cluster, the probability estimates for new items from source categories A, B, and C will typically be the same, regardless of the specific category within source category cluster X to which they belong. For example, if source categories A, B and C all belong to category cluster X, the estimated probability that a new item from source category A should be assigned to target category Z is 50%, then the estimated probability that a new item from source category B or C should be assigned to target category Z will also be 50%.

Various mechanisms may be used to determine how many source category clusters to use, and how map source categories to those source category clusters. The techniques described herein are not limited to any particular type of mechanism for establishhing source category clusters.

With respect to how many source category clusters a categorization system should have, both having too many clusters, or too few clusters, may lead to inefficiency. Specifically, if the number of source category clusters is too high, then some source category clusters may not have enough items to exceed the threshold. For example, if the number of training set items in category cluster X is still below the threshold, then source categories A, B, and C are still treated as insufficiently sampled source categories. At the other extreme, if the number of source category clusters is too small, then the types of items in a source category cluster may be so diverse that source category cluster membership ceases to be an accurate indication of how items should be categorized.

With respect to mapping source categories to source category clusters, the greater the similarity between the source categories that are mapped to a source category cluster, the better the training set items for the source category cluster will be for predicting the assignments for new items in the cluster. For example, if source categories A, B and C correspond to three different types of shoelaces, the collective statistics of training set items cluster X will probably be good predictors for new items from source categories A, B and C. However, if source categories A, B and C respectively correspond to apples, cars and nails, then the collective statistics of training set items in cluster X will probably not be good predictors for new items from source categories A, B, and C.

In some embodiments, probabilities for certain source categories may be calculated based on the source category itself, while probabilities for other source categories may be calculated relative to the cluster in which the source categories belong. For example, one embodiment may support three possible states for a source category: (1) a state in which the source category is fully addressed without clustering it, (2) a state in which the source category is clustered, and (3) a state in which the source category is not treated as independent factors (e.g. an insufficiently sampled source category).

Benefits of clustering sources and giving each cluster special treatment (either specially modeling its prior probability, or building a specific classifier for each cluster) is useful when it would not be efficient to specially treating each source specially. The number of sources could be a lot. It is too computationally expensive to model each source individually.

Some sources may be similar. For example in a shopping site, different merchants (e.g. Kings Jewelry, New York Jewelry, Zeals) may sell similar types of products. In other words, these merchants have similar product-category distributions. Therefore, it is reasonable to put them into one cluster and build a model for this cluster.

There are a variety of advantages to using such clustering structure, including:

(1) Clustering similar sources could significantly reduce the computational complexity, and make the special structure of classification scalable with the increase of data sources.

(2) Clustering similar sources could also alleviate overfitting which is often caused by fitting too well a limited (e.g. single) set of information.

In one embodiment, merchants are based on their product-category distribution (e.g. using distributional clustering). A classifier is then built for each merchant cluster. These classifiers can be organized in a hierarchical structure, according to different granularity. For example, the root classifier is a generic classifier. The middle layer are classifiers for merchant clusters. The bottom layer are classifiers for each (or major) individual merchants. Each classifier is a tree node.

Products from a new merchant can be assigned to a tree node whose products are similar to the new products, and are classified using the corresponding classifier. The root classifier may then be used for classifying the new products where no similar merchant (cluster) specific classifiers are found. Root classifier corresponds to the "unclustered" state, mentioned above.

Classification Contexts

Many of the examples given herein are in the context of a product classification system. However, the techniques described herein are applicable to any context in which things that have already been categorized in one domain are assigned to categories in another domain. For example, the techniques described herein may be used to assign job listings obtained from numerous job listing services to job categories used by a job listing site. Each of the job listing services from which the job listings are obtained may have categorized their listings according to their own source scheme, and those source categories may be used as a factor in determining the target categories, within the target scheme, for those job listings.

As another example, one party may want to classify, in a target scheme, documents obtained from a variety of sources. One or more of those sources may have used their own categorization scheme to categorize their documents. Using the techniques described herein, the appropriate category of the target scheme may be selected based, at least in part, on the source categories assigned to the documents.

As yet another example, to maximize the effectiveness of advertisements, a web portal may want to make sure that the advertisements displayed by web pages relate to the subject matter of the web pages. To accomplish this, the advertisements may be assigned to target categories in a target scheme, and web pages (which may contain search results) may be assigned to target categories in the same target scheme. Thus, when a web page is requested, the target category of the web page can be determined, and advertisements from that target category may be selected for inclusion. In this example, if the advertisements have been categorized by advertisers, those source categories can be used to assign the advertisements to target categories. Similarly, if web pages (or search queries) have been categorized based on one or more source schemes, then the source categories associated with the web pages or queries may be used to assign target categories to them.

In another example, it is common for computer users to categorize items (events, photos, etc.) by assigning tags to them. Frequently, the tagging mechanism does not impose any particular tagging scheme, but allows users the flexibility to develop their own. For a variety of reasons, it may be useful to impose a unified tagging scheme on items that have been tagged by a diverse and non-uniform set of taggers. In this context, the user-assigned tags themselves reflect how the users have categorized the items (the source categories). The techniques described herein may be used to assign target tags (the target categories) to such previously-tagged items.

These are merely non-limited examples of situations in which items from a diverse set of categorization schemes may be assigned to a unified or "common" categorization scheme. By taking into account the source category to which such items are assigned, the accuracy of the target category assignment process is improved.

EXAMPLE IMPLEMENTATION

The techniques described herein may be implemented, for example, at a shopping web site that obtains product information from multiple merchants, where the product information includes merchant category information for the products. In a shopping site implementation, a product-offer record may include, for example, product title, description, price, merchant category (MC) and MID, etc.

For identification purpose, each merchant is associated with a unique merchant ID (MID) in the shopping site's databases. Each merchant also uses one or more merchant categories, e.g. Computers and Software, to describe the type(s) of set(s) of its products. Merchant categories (MCs) are freely chosen by merchants and have no necessary connection with shopping site's categorization taxonomy.

While it is reasonable to assume that merchants select words carefully to make their MCs indicative for the shopping categories of their products, a product categorizer that does not use the techniques described herein may not treat the MC any differently than other fields of the product offering. Specifically, the product categorizer may merely take each MC keyword (a non-stop word after being trimmed) as a textual product feature. In this context, a non-stop word refers to a word which is not a stop word. A stop word is functional word like "of", "for", "in". The product categorizer may then model the different values of feature MID using the multivariate Bernoulli model.

To improve product categorization accuracy, the shopping web site's categorizer may be modified to implement the techniques described herein. For example, while each merchant can label itself with different MCs with respect to different sets of their product feeds, different merchants can choose the same MC. The <MC, MID> pair describes a finer level of merchant specific product cluster than either MC or MID. For example, a general merchant (e.g., Walmart.com) sells a wide range of products, and the <MC, MID> pair represents a subset of its products more specifically than either MID or MC.

In a real-world scenario, it is typical that the majority of the <MC, MID> pairs have products that are distributed in no more than ten shopping categories. In this situation, it is apparently more informative to model the prior category probabilities in the naive Bayes model using the product-category distribution of a merchant, than the conventional MLE (maximum likelihood estimation) which doesn't make use of merchant information. This special modeling of prior probability gives higher weight to those most likely candidate shopping categories, and significantly improves categorization accuracies.

Document Categorization in a Shopping Embodiment

According to one embodiment, there are two major phases in document categorization: (1) training (a.k.a learning) and (2) categorization. A document categorization model is usually used in both phrases. During training, various parameter values of the model are determined based on manually categorized examples in an optimization process, and these values are used to categorize documents in production (at categorization time). Either training or testing process can be divided into three subsequent modules: lexical analysis, feature calculation, and classification. The lexical analysis takes the raw document (i.e. the product record in our application) as input and produces a stream of tokens and possibly a set of non-text data field values. A token corresponds to a word, a phrase, a punctuation mark, or a morphological word stem (more generally "lexeme"), etc. Non-text data are other attributes that aren't really part of the token stream, e.g., MID and product price. Feature calculation (a.k.a. "extraction") operates on the token stream and non-text data to produce numerical, binary and categorical features. The numerical value of a feature is usually calculated based on the frequency that a feature appears in a document, e.g., TF or TFIDF. A document is usually represented by a feature vector (set of feature values). To reduce computational complexity or noisy features, various types of dimensionality reduction are sometimes used to reduce the number of features, e.g., DF thresholding, LSI, or distributional feature clustering. Features are usually selected from training data. A test document is usually represented by only the features that are selected at the training phase.

The final module in document categorization process is usually the classifier. The classifier takes the feature vector as input and produces the category identifier/label as output. The training phase computes the classifier parameter values that give the best classification accuracy, based on the training data and the selected feature set. The classifier learned in the training phase is used to predict the class labels of test documents.

Classification Models

Because of semantic ambiguity, words that constitute a merchant category may not be uniquely associated with a merchant, and therefore may not have a very high power of distinguishing categories in the bag-of-word model. For example, a merchant whose MC contains the word "pattern" provides products of types "Collectibles.Art Supplies", "Apparel", or "Antiques and Collectibles". However, the word "pattern" also appears in the titles and descriptions of products of many other types, such as "Books.Magazines", "Electronics", and "Computers and Software".

Merchants can be classified into as general merchants or specific merchants. General merchants such as "Wal-Mart" or "Amazon" provide diverse products; specific merchants such as "talker.com" or "www.cdconnection.com" provide only a limited number of product types. To categorize a product from a specific merchant, a classifier may be designed to focus on the mostly likely candidate categories of this merchant.

The most likely candidate categories for a particular merchant can be estimated from the product-category distribution of a merchant in the training dataset. Narrowing down the candidate categories improves classification accuracy in the following situations: (1) two categories are very similar to each other, but a <mc, mid> pair is associated with only one of the two categories; (2) Some text features strongly indicate multiple categories, but a <mc, mid> pair is only associated with some of the categories. Narrowing down the candidate categories may also save computation time.

Modelling the Prior Category Probability Using the Product-Category Distribution of a Merchant The techniques described herein may be used with a variety of classification models. One such classification model is a Naïve Bayes model. Example Naïve Bayes categorizers are described in David D. Lewis, "Naïve (Bayes) at forty: The independence assumption in information retrieval"; in Claire N'edellec and C'eline Rouveirol, editors, Proceedings of ECML-98, 10th European Conference on Machine Learning, number 1398, pages 4-15, Chemnitz, DE, 1998, herein referred to as "Lewis". Examples of how such classifiers may be employed in the context of a product classification system are given in '588.

As explained above, the accuracy of such classifiers may be improved by taking into account information about source categorization. With the knowledge of merchant product-category distribution, classifying a product is casted to a problem as shown by the objective function 200 illustrated in FIG. 2, which is further reformulated as the function 210 illustrated in FIG. 2.

To take into account the source categorization information, the classifier may approximate $p(x_0|<mc, mid>_j, c_i)$ with $p(x_0|c_i)$ because the data may provide more robust estimation on the likelihood of features conditional on the category. One difference between formula 210 and a standard naive Bayes lies in the prior category probability.

Equation 300, illustrated in FIG. 3, shows the estimation of $p(c_i|<mc, mid>_j)$ using Laplacine's succession rule (or additive smoothing), where $\delta$ is the smoothing probability. $\delta$ is usually set as 1, but can also be empirically set as other values such as 0.001. The classifier gives each category that is not affiliated with a chosen <mc, mid> pair an equally small probability of "winning" the final categorization.

In general, a "specific" merchant can better take advantage of the idea of narrowing-down categories than a "general" merchant. Although a <mc, mid> pair corresponds to a more specific subset of products than either a MC or MID, the pair can still have a very diverse set of product types. Therefore, in one embodiment, the classifier sets an "affiliation" threshold (Y) and chooses <mc, mid> pairs that have products from at most Y categories, i.e., the <mc, mid> pairs that are "affiliated" with at most Y categories.

A fair estimation of product-category distribution needs a sufficient number of products of each merchant in the training data. Therefore, in one embodiment, another size threshold S0 is set for choosing <mc, mid> pairs that have at least S0 products in the training set.

The classifier is constructed to accommodate both types of merchants. For the specific merchants which satisfy the above Y and S0 constraints, the classifier classifies their products according to objective function 210. For the general merchants otherwise, a generic classifier, that uses standard naive Bayes model, that is trained on all training products for classification is employed.

In one embodiment, a classifier that is sensitive to the source categories associated with items works in the following logic:

1. Build a mapping table between selected <mc, mid> pairs and target categories from training products. The <mc, mid> pairs are selected based on thresholds SO and Y that are discussed above.

2. Build a feature vector for each test product and check if its <mc, mid> pair is in the mapping table. If not, then the product is categorized by the standard naive Bayes model.

3. If the <mc, mid> pair of the test product is in the mapping table, classify the product according to Function 210.

Figure 4:
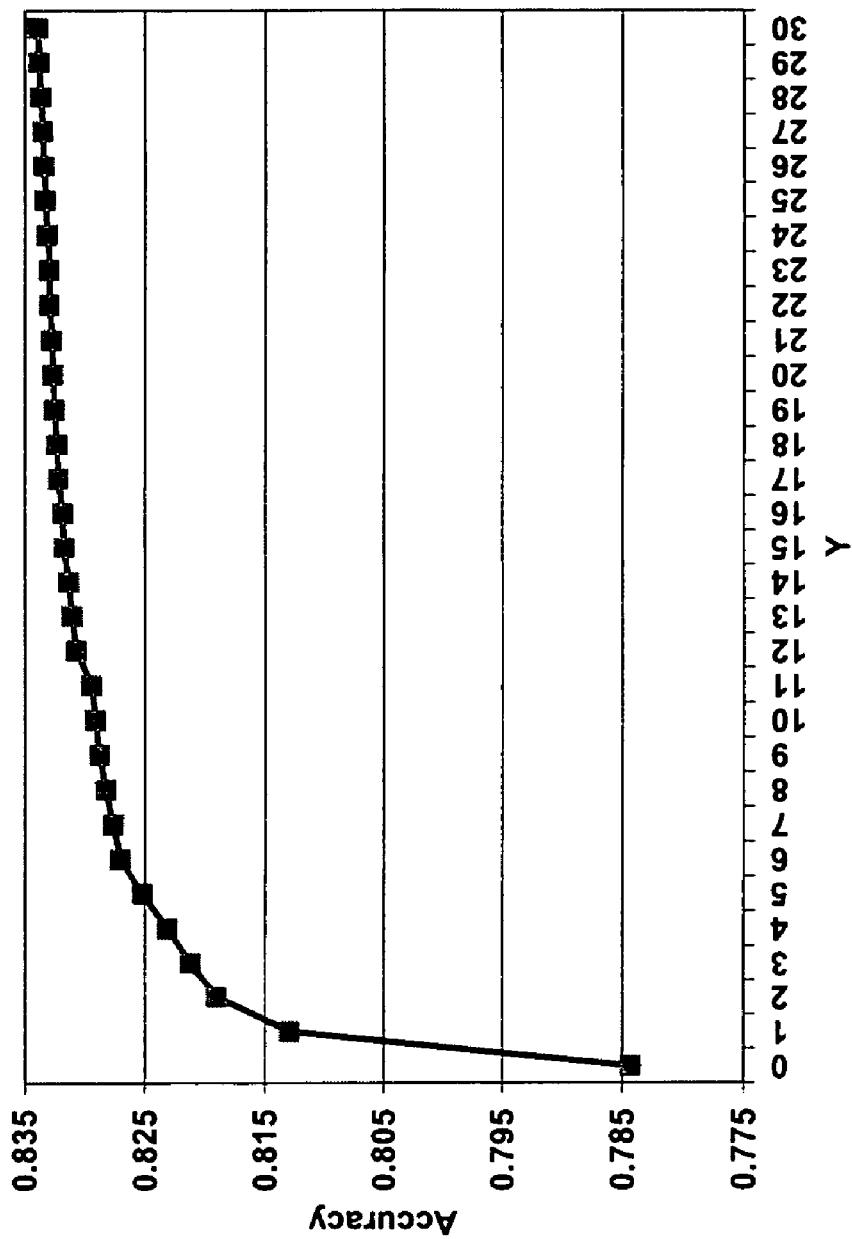
FIG. 4 is a block diagram illustrating an example in which a test product is misclassified.

FIG. 4 shows an example in which a test product is misclassified as "Sports". This product may have features that help achieve high classification scores in both "Sports" and its correct category "Apparel". However, the <mc, mid> pair of this product is not seen to be affiliated with category "Sports" in the training data. The prior category probability $p(c_i|<mc, mid>_j)$ contributes correcting such misclassification.

It is possible that the products that a <mc, mid> has in the training data is not a representative set of this <mc, mid> pair. For example, a new merchant may have a limited diversity of products seen in the training data at the beginning. Setting a smoothing probability helps classifying the product into the correct category which is not seen affiliated by the <mc, mid> pair in the training data.

Hardware Overview

Figure 5:
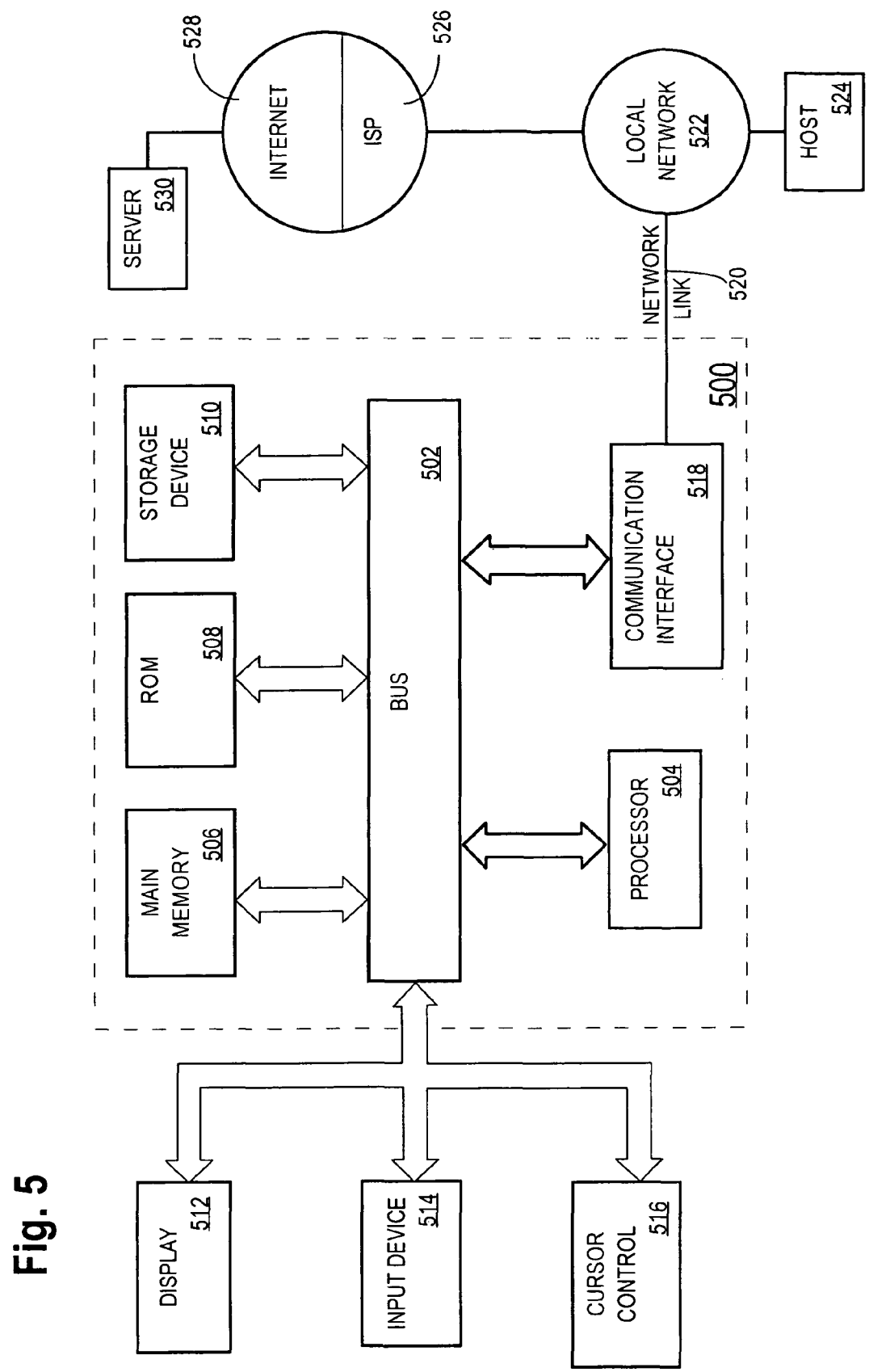
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   automatically assigning items to target categories in a target scheme;
   wherein the items assigned to the target categories in the target scheme include a first set of items;
   wherein items in the first set of items have previously been assigned to source categories in a first source scheme that is different from said target scheme;
   wherein the first set of items includes a particular item;
   wherein the step of assigning items to categories in the target scheme includes:
      receiving information about the particular item;
      determining, from the information, a source category to which the particular item was assigned in the first source scheme;
      determining a set of probability values, wherein each probability value in the set of probability values corresponds to a target category and represents an estimate of the probability that items associated with said source category should be assigned to said target category; and
      assigning the particular item to a target category based, in part, on the source category to which the particular item was assigned and said set of probability values;
   wherein the steps of the method are performed by one or more computing devices.

2. The method of claim 1 wherein:
   the items assigned to the target categories in the target scheme also include a second set of items;
   items in the second set of items have previously been assigned to source categories in a second source scheme that is different from said target scheme, and that is different from said first source scheme;
   wherein the second set of items includes a second item;
   wherein the step of assigning items to categories in the target scheme includes:
      receiving information about the second item;
      determining, from the information, a source category to which the second item was assigned in the second source scheme;
      determining a second set of probability values, wherein each probability value in the second set of probability values corresponds to a target category and represents an estimate of the probability that items associated with said source category to which said second item was assigned should be assigned to said target category; and
      assigning the particular item to a target category based, in part, on said second set of probability values.

3. The method of claim 2 wherein:
   a first source identifier that identifies the first source is treated as a component of the source category of the particular item; and
   a second source identifier that identifies the second source is treated as a component of the source category of the second item.

4. The method of claim 1 wherein a source identifier that identifies the first source is treated as a component of the source category of the particular item.

5. The method of claim 1 wherein:
   the items are products; and
   the step of automatically assigning items to target categories in a target scheme includes assigning products, offered by a plurality of merchants, to target categories in a shopping web site.

6. The method of claim 3 wherein:
   the step of receiving information about the particular item includes receiving a product offer record for a particular product offered by a particular merchant;
   the step of determining, from the information, a source category to which the particular item was assigned in the first source scheme includes determining, from the product offer record, a merchant category to which said particular merchant assigned said particular product.

7. The method of claim 1 wherein:
   the items are products;
   the step of automatically assigning items to target categories in a target scheme includes assigning products, offered by a plurality of merchants, to target categories in a shopping web site; and
   each probability value in the set of probability values corresponds to a target category and represents an estimate of the probability that a product associated with said plurality of merchants should be assigned to said target category.

8. The method of claim 1 further comprising:
   determining whether a source category associated with a new item is a non-determinative source category; and
   if the source category associated with the new item is a non-determinative source category, then assigning the new item to a target category without estimating the probability that items associated with said source category should be assigned to each target category.

9. The method of claim 1 further comprising:
  determining whether a source category associated with a new item is an insufficiently sampled source category; and
  if the source category associated with the new item is an insufficiently sampled source category, then assigning the new item to a target category without estimating the probability that items associated with said source category should be assigned to each target category.

10. The method of claim 1 wherein the step of assigning the particular item to a target category is based on assignments made to items that belong to a training set.

11. The method of claim 10 wherein:
  items from said training set that are associated with said source category have been assigned to a subset of the target categories of the target scheme; and
  the step of assigning the particular item to a target category includes disqualifying, as target categories to which the particular item may be assigned, all target categories that do not belong to said subset.

12. The method of claim 1 wherein:
  the step of assigning the particular item to a target category is based, in part, on assignments made to items that belong to a training set; and
  a smoothing function is applied to statistics associated with the training set to determine the set of probability values.

13. The method of claim 1, wherein the step of assigning the particular item to a target category based, in part, on the source category to which the particular item was assigned includes:
  determining, based on a source-category-to-cluster mapping, a cluster to which said source category has been mapped, and
  assigning the particular item to a target category based, in part, on the cluster to which the source category has been mapped.

14. The method of claim 13 wherein the step of assigning the particular item to a target category based, in part, on the cluster to which the source category has been mapped includes:
  determining a set of probability values, wherein each probability value in the set of probability values corresponds to a target category and represents an estimate of the probability that items associated with categories that map to said cluster should be assigned to said target category; and
  assigning the particular item to a target category based, in part, on said set of probability values.

15. The method of claim 14 wherein:
  the source-category-to-cluster mapping maps source categories to clusters; and
  the clusters include at least one cluster to which source categories from multiple source schemes have been mapped.

16. The method of claim 14 further comprising:
  determining whether a cluster associated with a new item is a non-determinative cluster; and
  if the cluster associated with the new item is a non-determinative cluster, then assigning the new item to a target category without estimating the probability that items associated with source categories that map to said cluster should be assigned to each target category.

17. The method of claim 14 further comprising:
  determining whether a cluster associated with a new item is an insufficiently sampled cluster; and
  if the cluster associated with the new item is an insufficiently sampled cluster, then assigning the new item to a target category without estimating the probability that items associated with said source categories that map to said cluster should be assigned to each target category.

18. A non-transitory computer-readable medium that stores instructions which, when executed by one or more processors, cause one or more computing devices to perform the steps of:
  automatically assigning items to target categories in a target scheme;
  wherein the items assigned to the target categories in the target scheme include a first set of items;
  wherein items in the first set of items have previously been assigned to source categories in a first source scheme that is different from said target scheme;
  wherein the first set of items includes a particular item;
  wherein assigning items to categories in the target scheme includes:
    receiving information about the particular item;
    determining, from the information, a source category to which the particular item was assigned in the first source scheme;
    determining a set of probability values, wherein each probability value in the set of probability values corresponds to a target category and represents an estimate of the probability that items associated with said source category should be assigned to said target category; and
    assigning the particular item to a target category based, in part, on the source category to which the particular item was assigned and said set of probability values.

19. The non-transitory computer-readable medium of claim 18, wherein:
  the items are products;
  the step of automatically assigning items to target categories in a target scheme includes assigning products, offered by a plurality of merchants, to target categories in a shopping web site; and
  each probability value in the set of probability values corresponds to a target category and represents an estimate of the probability that a product associated with said plurality of merchants should be assigned to said target category.

20. The computer-readable storage of claim 18 wherein the step of assigning the particular item to a target category based, in part, on the source category to which the particular item was assigned includes:
  determining, based on a source-category-to-cluster mapping, a cluster to which said source category has been mapped, and
  assigning the particular item to a target category based, in part, on the cluster to which the source category has been mapped.

21. The computer-readable storage of claim 20 wherein the step of assigning the particular item to a target category based, in part, on the cluster to which the source category has been mapped includes:
  determining a set of probability values, wherein each probability value in the set of probability values corresponds to a target category and represents an estimate of the probability that items associated with categories that map to said cluster should be assigned to said target category; and
  assigning the particular item to a target category based, in part, on said set of probability values.

22. The non-transitory computer-readable medium of claim 18 wherein:

the items assigned to the target categories in the target scheme also include a second set of items;

items in the second set of items have previously been assigned to source categories in a second source scheme that is different from said target scheme, and that is different from said first source scheme;

wherein the second set of items includes a second item;

wherein the step of assigning items to categories in the target scheme includes:

receiving information about the second item;

determining, from the information, a source category to which the second item was assigned in the second source scheme;

determining a second set of probability values, wherein each probability value in the second set of probability values corresponds to a target category and represents an estimate of the probability that items associated with said source category to which said second item was assigned should be assigned to said target category; and assigning the particular item to a target category based, in part, on said second set of probability values.

* * * * *